United States Patent

Kato

[15] 3,638,954

[45] Feb. 1, 1972

[54] SPIRAL TRACK TYPE MAGNETIC RECORDING AND REPRODUCING DEVICE

[72] Inventor: Saburo Kato, Kanagawa-ken, Japan

[73] Assignee: Kabushiki Kaisha Ricoh, Tokyo, Japan

[22] Filed: Apr. 22, 1969

[21] Appl. No.: 818,255

[30] Foreign Application Priority Data

Apr. 24, 1968 Japan....................................43/27556

[52] U.S. Cl.............................274/4 J, 179/100.2 T, 274/14, 274/15

[51] Int. Cl............................................................G11b 5/80

[58] Field of Search.................................274/4.2, 13, 14, 15; 179/100.2 T

[56] References Cited

UNITED STATES PATENTS 2,925,279 2/1960 Fontaine.........................274/13 A UX 3,210,082 10/1965 Murata.........................179/100.2 T X 3,214,175 10/1965 Nakamatsu.............................274/4 J 3,322,427 5/1967 Fujimoto......................179/100.2 T X 3,369,813 2/1968 Nagashima..............................274/15

*Primary Examiner*—Leonard Forman
*Assistant Examiner*—Dennis A. Dearing
*Attorney*—Burgess, Ryan and Wayne

[57] ABSTRACT

A spiral track type magnetic recording and reproducing device of the type in which upon depression of a first pushbutton (11) the recording or reproduction operation is started; upon completion of said operation, a head is automatically returned to its initial position and said device is also stopped; upon depression of said pushbutton at an arbitrary time during the course of said operation, said operation can be interrupted temporarily upon depression of said pushbutton again, said interrupted operation can be restarted; and only a desired portion of the recording can be repetitively reproduced by depressing a second pushbutton (1) at an arbitrary time during said operation, keeping depressing for a desired time and then releasing said second pushbutton.

3 Claims, 15 Drawing Figures

INVENTOR

SABURO KATO

BY Burgess, Ryan & Hicks
ATTORNEYS

INVENTOR
SABURO KATO
BY Burgess, Ryan & Hicks
ATTORNEYS

INVENTOR

SABURO KATO

BY Burgess, Ryan & Hicks
ATTORNEYS

INVENTOR

SABURO KATO

BY *Burgess, Ryan & Hicks*

ATTORNEYS

INVENTOR
SABURO KATO
BY Burgess, Ryan & Hicks
ATTORNEYS

INVENTOR

SABURO KATO

BY Burgess, Ryan & Hicks
ATTORNEYS

INVENTOR
SABURO KATO
BY Burgess, Ryan & Hicks
ATTORNEYS

INVENTOR

SABURO KATO

BY Burgess, Ryan & Hicks
ATTORNEYS

INVENTOR

SABURO KATO

BY Burgess, Ryan & Hicks
ATTORNEYS

SPIRAL TRACK TYPE MAGNETIC RECORDING AND REPRODUCING DEVICE

BACKGROUND OF THE INVENTION

The present invention generally relates to a spiral track-type magnetic recording and reproducing device and more particularly to a spiral track-type magnetic recording and reproducing device of the type in which the recording or reproduction operation can be stopped and restarted at any arbitrary time during said operation and any desired portion of the recording can be repetitively reproduced.

A spiral track-type magnetic recording and reproducing device has been finding wide applications since its development. The most prominent advantages of such the device of the type described is it is used as a teaching machine. When used as a teaching machine, the device is required to be stopped and restarted at an arbitrary time during the course of operation and to be capable of repetitively reproducing only a desired portion of the recording.

In view of the above, the primary object of the present invention is to provide a spiral track-type magnetic recording and reproducing device which can satisfactorily and completely meet the requirement as described above.

Another object of the present invention is to provide a spiral track-type magnetic recording and reproducing device which is simple yet reliable in operation.

SUMMARY OF THE INVENTION

In brief, in a spiral track-type magnetic recording and reproducing device of the present invention, upon depression of one pushbutton for recording or reproduction, the recording or reproduction operation is started and upon completion of said operation, a head is automatically lowered so as to be spaced apart from a recording sheet and is returned in this state to its initial position at higher speed and concurrently a turntable is automatically stopped, thereby preparing for the next operation, and if necessary said operation can be stopped and then restarted at any arbitrary time during the course of said operation by depressing said pushbutton. Only one pushbutton serves as the operative button for starting, interrupting and restarting as described above.

According to another feature of the present invention, one more pushbutton is provided so that upon depression of this pushbutton, any desired portion of the recording can be repetitively reproduced.

The above and other objects, features and advantages of the present invention will become more apparent from the following description of one preferred embodiment thereof with reference to the accompanying drawings.

DESCRIPTION OF THE PREFERRED EMBODIMENT

Figures 1, 2:
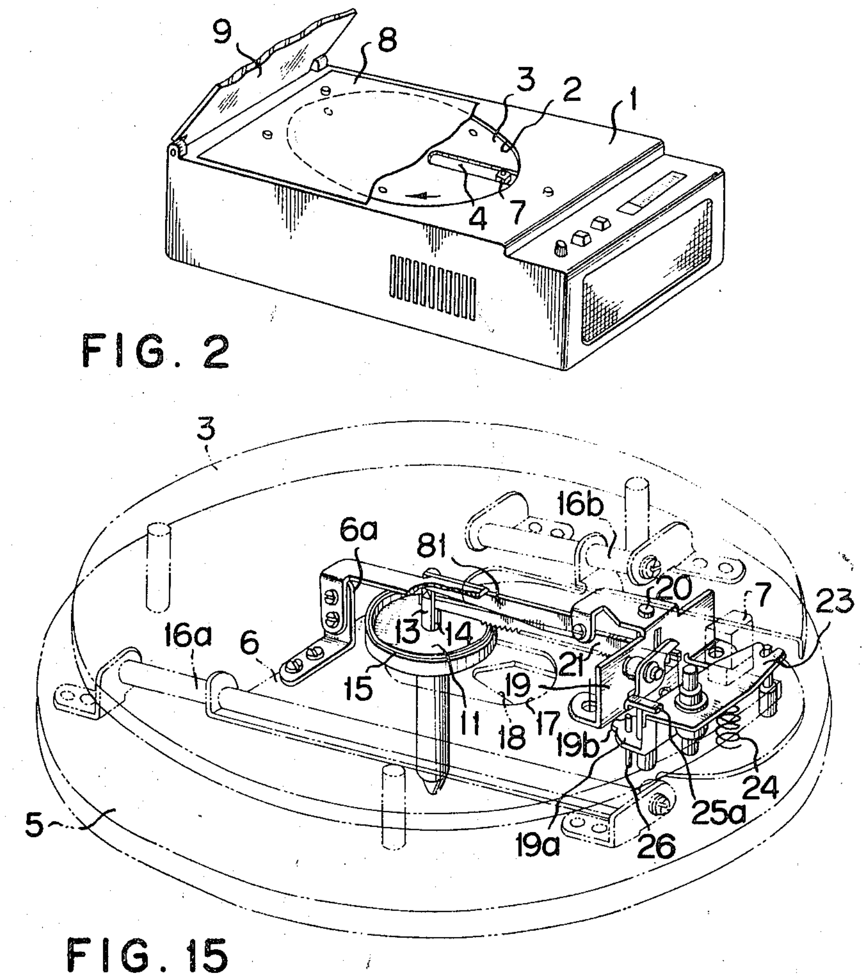
FIG. 1 is a perspective view of a spiral track-type magnetic recording and reproducing device.
FIG. 2 is a perspective view of the essential parts of a recording and reproducing head assembly drive mechanism of the device of the present invention.

FIG. 1 shows the general appearance of a spiral track-type magnetic recording and reproducing device. The top plate of a box-shaped main body 1 has an annular opening in which is disposed an ornamental disk or upper disk 3 slightly below the surface of the top plate and rotatably coaxially of the opening. The ornamental disk 3 has a slot 4 extended radially from the outer periphery thereof. A lower turntable 5 (See FIG. 2) is disposed below the ornamental disk 3 for rotation coaxially thereof. A recording and reproducing head 7 is resiliently supported through a plate 6 which is radially slidable upon the lower turntable 5 integral with the disk 3 so that the head 7 has a tendency to slightly extend upwardly through the slot 4 beyond the surface level of the ornamental disk 3. Upon the top plate 1 is placed a magnetic recording or reproduction sheet 8 with its recording or reproduction surface being directed downwardly and over the sheet 8 is placed a translucent cover plate 9 whose one side edge is hinged to one side edge of the top plate 1.

In this state, a suitable operation button is depressed so that the head 7 is pressed against the recording or reproduction sheet from below and is rotated about the axis of the disk and concurrently advanced toward the center along the slot 4, whereby the recording or reproducing is effected.

The invention will be described in more detail with reference to the accompanying drawings hereinafter, but it is to be understood that although the description will be directed to the reproduction for the convenience of the explanation, the present invention can be applied in both of the recording and reproduction.

A. Turntable and its accessories

Within the main body 1 of the magnetic recording device of the present invention is detachably disposed a horizontal intermediate plate 10 and within a vertical tubular shaft bearing 10*a* securely fixed to the intermediate plate 10 is coaxially fitted a lower portion of a tubular shaft 11*a* having a saucer-shaped flange 11 formed at the top end thereof. A sleeve 12 is fitted over the tubular shaft 10*a* and the flanged portion of the sleeve 12 is integrally riveted to the periphery of the central aperture of the lower turntable 5. The upper turntable (ornamental disk) 3 is disposed in vertically and coaxially spaced-apart relation with the turntable 5 by means of three spacing supports. A central shaft or spindle 13 is loosely fitted in the tubular shaft 11*a* and the upper portion of the central shaft 13 having a slot 14 (See FIG. 2) extends by a suitable distance through the center hole of the saucerlike flange 11 formed integrally at the top end of the tubular shaft 11*a*. Upon the upper surface of the upwardly extended peripheral edge of the flange 11 are formed a few turns of spiral grooves 15 which have a small pitch and whose center is coaxial with the shaft 13.

Two parallel horizontal guide rods 16*a* and 16*b* are disposed upon the lower turntable 5 (See FIG. 2) and the sliding plate 6 is slidably carried by these guide rods 16*a* and 16*b* by means of a few ear members extended from the plate 6. The sliding plate 6 is parallel with the lower turntable 5 and is provided with a slot 17 so that the tubular shaft 11a and the sleeve 12 fitted thereover will not prevent the slidable movement of the plate 6. In parallel with the slot 17 is formed a relatively elongated slot 18 in the lower turntable 5. A metal plate 19 is riveted to the sliding plate 6 at a right angle with respect to the extension of the major axis of the slot 17. A vertical shaft 20 is vertically slidably fitted into a hole of an ear element 19a extending from the upper edge of the plate 19 and a hole formed in an ear element 19b (See FIG. 5) of a depending member extending downwardly from the upper ear element 19a through the slot 18 beyond the lower turntable 5. One end of a rack 21 is fixedly secured to the vertically sliding shaft 20 with its teeth being directed downwardly so as to engage with the spiral grooves formed upon the upper peripheral surface of the flange 11. Between a suitable position of the rack 21 and a suitable position of the depending member of the plate 19 is loaded a relatively strong compression spring 22 so that both of the plate 19 and the rack 21 are biased downwardly but stopped when the rack 21 engages with the spiral grooves 15. The free end of the rack 21 extends through the slot 14 formed at the top portion of the shaft 13 extending from the center of the flange 11. The other end of the rack 21 is further extended a suitable distance beyond the plate 19 through a slot formed therethrough.

A supporting plate 23 supporting thereupon a recording head 7 is supported by means of a relatively weak extension spring 24 and guide posts so as to be biased upwardly. One arm of a lever 25 pivotably mounted on a pivot extending from the side surface of the plate 19 rides upon the rack 21 as shown in FIG. 2 while a protrusion 25a extending horizontally from the other arm of the lever 25 extends above the supporting plate 23 so that the upward movement of the supporting plate 23 and its head 7 is limited. A small rod 26 is vertically slidably disposed between the sliding plate 6 and the ear member 19b extended horizontally from the depending member of the plate 19 and an extension spring is loosely fitted over the small rod 26 between the sliding plate 6 and a retaining washer of the small rod 26 (See FIG. 5) so that the small rod 26 is biased normally downwardly. A disk 27 formed from a synthetic resin or the like is overlaid upon the intermediate plate 10 coaxially of the tubular vertical shaft bearing 10a formed integrally with the intermediate plate 10 so that the disk 27 can be moved vertically but is normally pressed against the upper surface of the intermediate plate 10 by the force of an extension spring 29 loaded around the tubular shaft 10a between a synthetic annular disk 28 (See FIG. 5) coaxially and integrally secured to the upper portion of the tubular shaft 10a and said disk 27. A synthetic disk 30 is secured to the lower turntable 5 coaxially and integrally therewith in a slightly spaced-apart relation with the disk 28. A resilient electrically conductive contact element secured to the upper surface of the disk 28 at a position eccentrically of the center thereof is in contact with a conductor printed upon the undersurface of the disk 30 in the form of a bull's eye and electrically connected to the head 7 so that the contact upon the fixed disk 28 can be connected to a power source, whereby the current can be supplied to the movable head.

Figure 4:
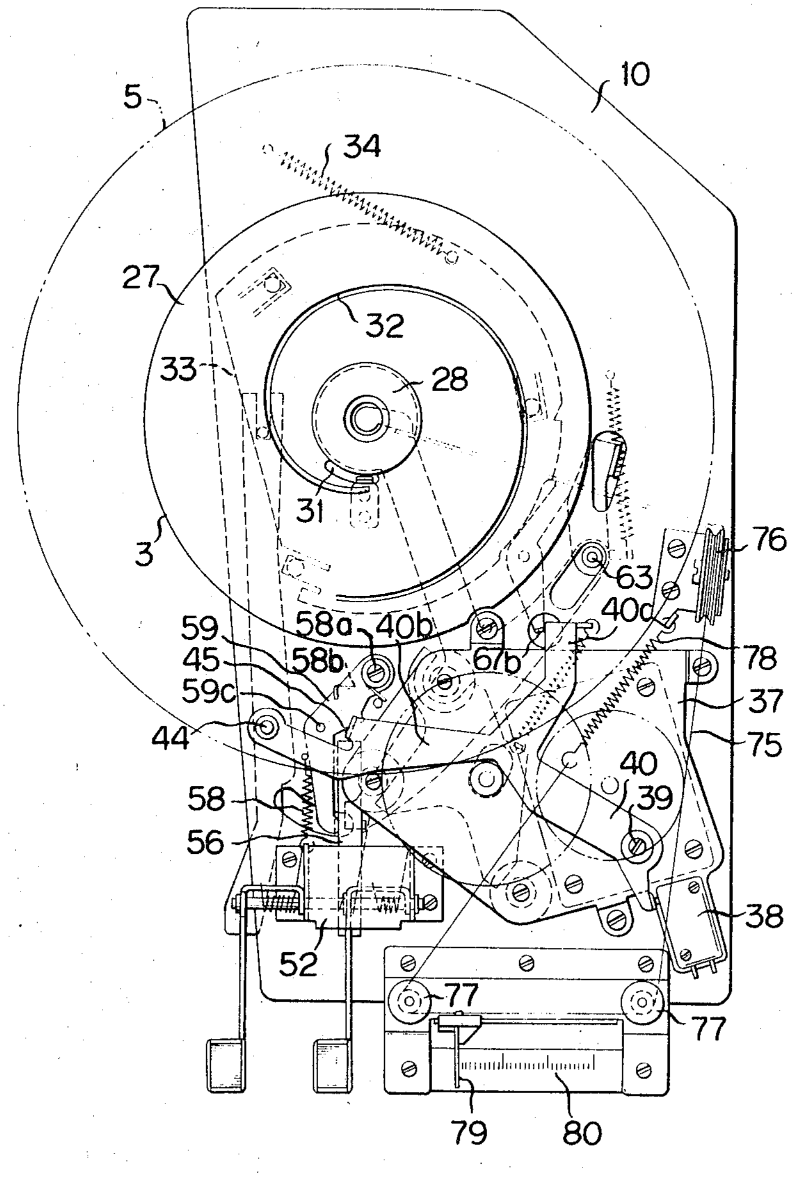
FIG. 4 is a plan view similar to FIG. 3 except that the turntable is removed, FIG. 5 a longitudinal sectional view of said intermediate plate and the turntable carried thereupon.

As shown in FIG. 4, the synthetic disk 27 is provided with a short arcuate notch or through bore 31 along the peripheral edge of the center hole of the disk 27 and with a turn of spiral groove 32 starting from a position in the vicinity of the notch 31 and having a coarse pitch.

Figure 5:
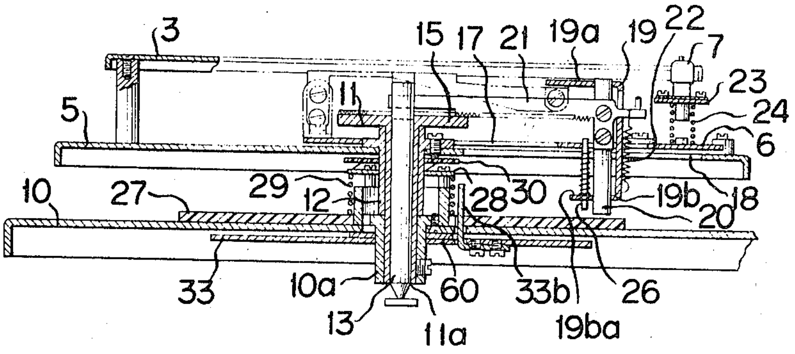

As shown in FIG. 5, normally the lower ends of the vertical shaft 20 and the small rod 26 are spaced apart from the upper surface of the disk 27 by a suitable distance, but when the disk 27 is moved upwardly against the spring 29 as will be described in more detail hereinafter, the rack 21 is moved upwardly by the vertical shaft 20 and concurrently the lower end of the small rod 26 is caused to engage with the spiral groove 32.

Figure 9:
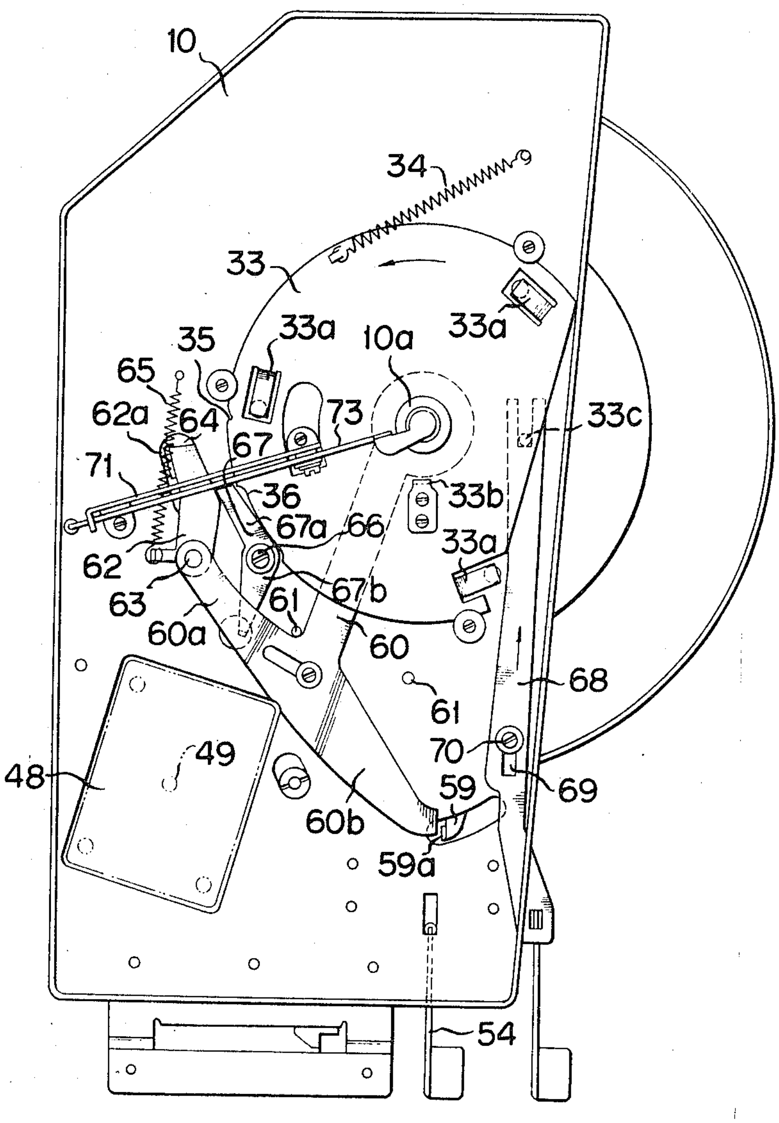
FIG. 9 is a rear view of FIG. 4.
Figure 10:
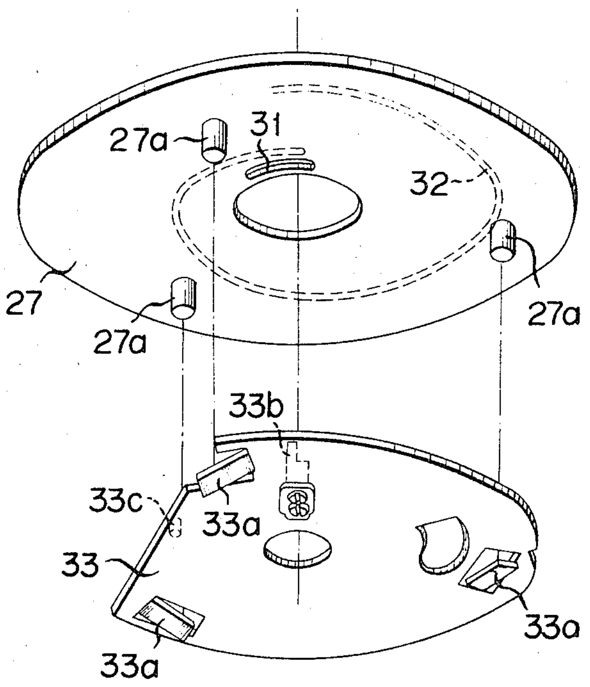
FIG. 10 is an exploded view for illustrating a synthetic disk and a segment (segment plate) coaxially mounted upon the opposite surfaces of the intermediate plate.
Figure 11:
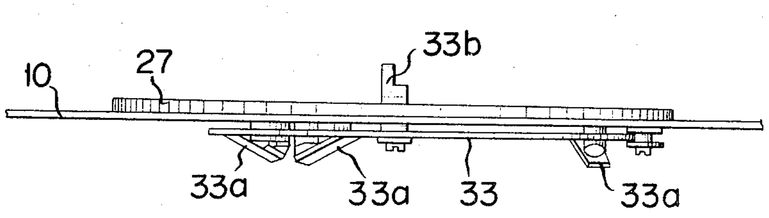
FIG. 11 is a side view of the assembly of the synthetic disk and the segment shown in FIG. 10.

As shown in FIGS. 9, 10 and 11 a segment 33 (a disk one portion of which is cut off) is disposed below the intermediate plate 10 coaxially of the disk 27 for rotation through a predetermined angle by means of a plurality of grooved rollers mounted upon the intermediate plate 10.

The segment 33 has a tendency to rotate in the clockwise direction in FIG. 9 because of a compression spring 34 one end of which is fixed to the intermediate plate 10. A plurality of protrusions 33a (only three are shown in FIG. 9) are formed along an imaginary circle coaxial with the segment 33 in such a manner that each of the protrusions 33a is inclined downwardly. Each of small pins 27a extending downwardly from the undersurface of the synthetic disk 27 rides upon the inclined surface of its corresponding protrusion 33a. When the segment 33 is rotated in the direction indicated by the arrow in FIG. 9 against the spring 34, the disk 27 above the segment 33 is caused to move upwardly against the spring 29 (See FIG. 5) through the small pins 27a. The segment 33 is further provided with a notch 35 formed at a suitable position of the periphery thereof and a small or shallow cutoff portion 36 along the periphery of the segment 33. The function of this notch and cutoff portion will be described in more detail hereinafter.

B. Drive device for rotary disk or turntable

Figure 6:
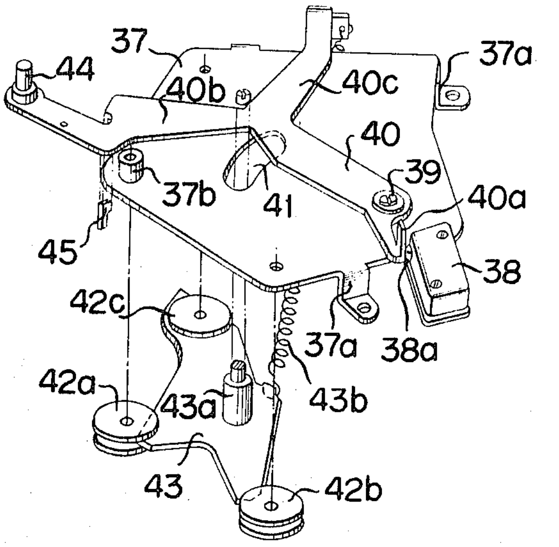
FIG. 6 is a perspective view of a pentagonal securing plate attached to the intermediate plate shown in FIG. 5 and of parts mounted upon both of the surfaces of the securing plate.

Referring to FIG. 6, a pentagonal securing plate 37 is disposed horizontally above the stationary intermediate plate 10 so as to be spaced therefrom by leg members 37a extending from the pentagonal securing plate 37. A microswitch 38 is securely fixed to an extension from the securing plate 37. A rocking arm 40 has its base portion pivotably fixed to a pivot 39 extending from the securing plate 37 in the vicinity of the microswitch 38. A movable lever 38a of the microswitch 38 is located within the passage of an upright member 40a extending from one arm of the rocking lever 40. An arcuate slot 41 whose center coincides with the pivot 39 is formed substantially at the center of the securing plate 37. To the undersurface of the securing plate 37 are rotatably attached three rollers 42a, 42b and 42c each having a peripheral groove into which is loosely fitted the peripheral edge of a plate 43 from whose upper surface extends a shaft 43a. The shaft 43a is loosely fitted through the arcuate slot 41 formed in the securing plate 37 and extends upwardly along the left side edge of the rocking lever 40 as shown in FIG. 6. The arm remote from the upright member 40a is bifurcated into arms 40b and 40c. At the free end of the arm 40b is extending a pin 44 which serves as abutting or engaging member as will be described in more detail hereinafter. A depending member 45 is depending from the intermediate of the arm 40b. Between the free end of the arm 40c and the movable plate 43 is loaded a compression spring 43b so that the shaft 43a extending from the movable plate 43 tends to press against the left-side edge of the rocking lever 40 in FIG. 6.

Figure 3:
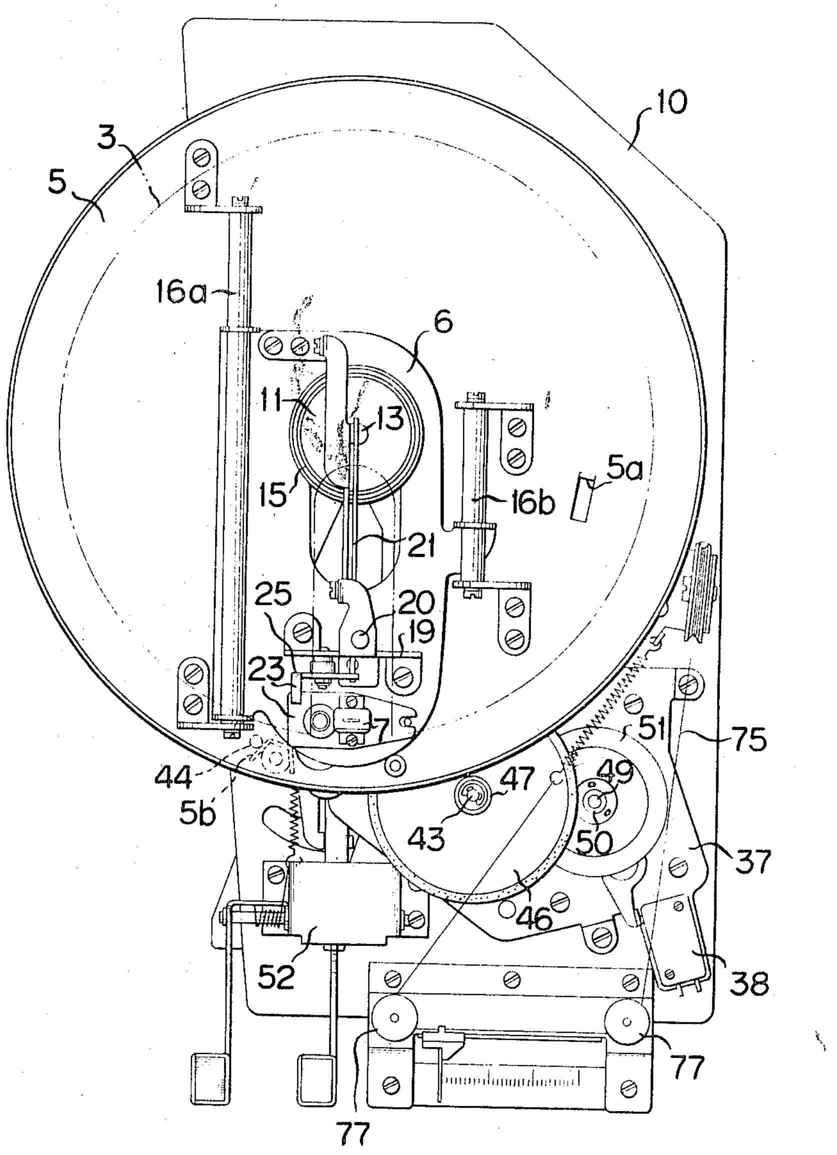
FIG. 3 is a plan view of an intermediate plate assembly removed out of the casing of the device, this assembly incorporating therein almost all of the major elements which constitute the present invention.

As shown in FIG. 3, an intermediate transmission wheel 46 having a friction material attached around the periphery thereof is fitted over the upper end of the shaft 43a and has a drive wheel 47 in contact with the turntable 5 in order to rotate the same.

Referring back to FIG. 9, a motor 48 is disposed under the intermediate plate 10 and the output shaft 49 of the motor 48 upwardly extends through the intermediate plate 10 and the securing plate 37. The output shaft 49 has a power wheel 50 secured at the top end thereof at the same level with the intermediate wheel 46 and a flywheel 51 secured in downwardly slightly spaced-apart relation with the power wheel 50. Normally, the intermediate wheel 46 and the drive wheel 47 are spaced apart from the power wheel 50 and the turntable 5 respectively by a suitable distance.

Figure 8:
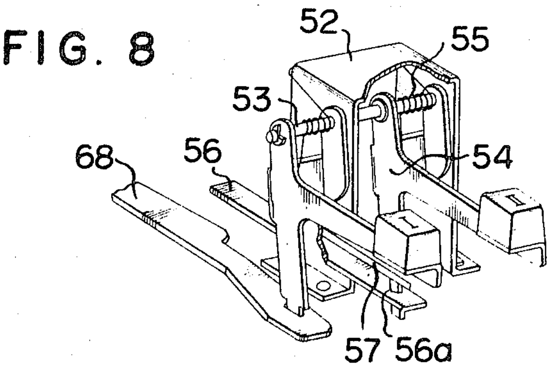
FIG. 8 is a perspective view illustrating the construction of pushbutton mechanism disposed upon the intermediate plate.

Referring to FIG. 8, upon the intermediate plate 10 is disposed an inverted U-shaped bearing member 56. The base of a depending arm 54 is fixed to a horizontal shaft 43 carried by the bearing member and pushbuttons I and II are fixed to the free ends of the levers horizontally extending from the depending arm 54. A spring 55 loaded over the lateral shaft 43 is adapted to give a tendency to the pushbutton II to move upwardly to a suitable height. The lower end of the depending arm 54 is loosely fitted into a slot 56*a* formed in a movable lever 56 disposed upon the intermediate plate 10. The lever 56 has a tendency of rotating in the counterclockwise direction about the lower end of the depending arm 54 in FIG. 8 by means of a spring 57 loaded over the depending arm 54. Between the arm 40*b* of the rocking lever 40 and the bearing member 52 is loaded a compression spring 58 so that the rocking lever 40 is imparted with the tendency of rotating in the counterclockwise direction, but this rotation is limited by a suitable stop 37*b* (see FIG. 6).

Figure 7:
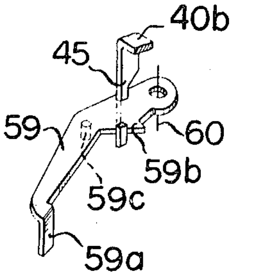
FIG. 7 is a perspective view of a rocking arm or lever mounted upon said intermediate plate.

At a suitable position of the stationary intermediate plate 10 an arm 59 is fixed to a pivot 60 in spaced-apart relation with the plate 10 by a suitable distance. The arm 59 has a tendency of rotating in the counterclockwise direction in FIG. 4 by a suitable spring 61 and the free end of the arm 59 is bent downwardly as shown by 59*a* in FIG. 7. The bent portion 59*a* is normally pressed against the outer side edge of the lever 56 which is drivingly interconnected with the pushbutton II. A projection or detent 59*b* having stepped portions and inclining edges formed on both side edges thereof for cooperating with the depending arm 45 from the arm 40*b* is formed at a suitable portion of the inner side edge of the arm 59. A downwardly directed pin 59*c* for cooperating with the leading edge of the lever 56 which in turn cooperates with the pushbutton II is disposed at a suitable position of the undersurface of the arm 59.

Figure 12:
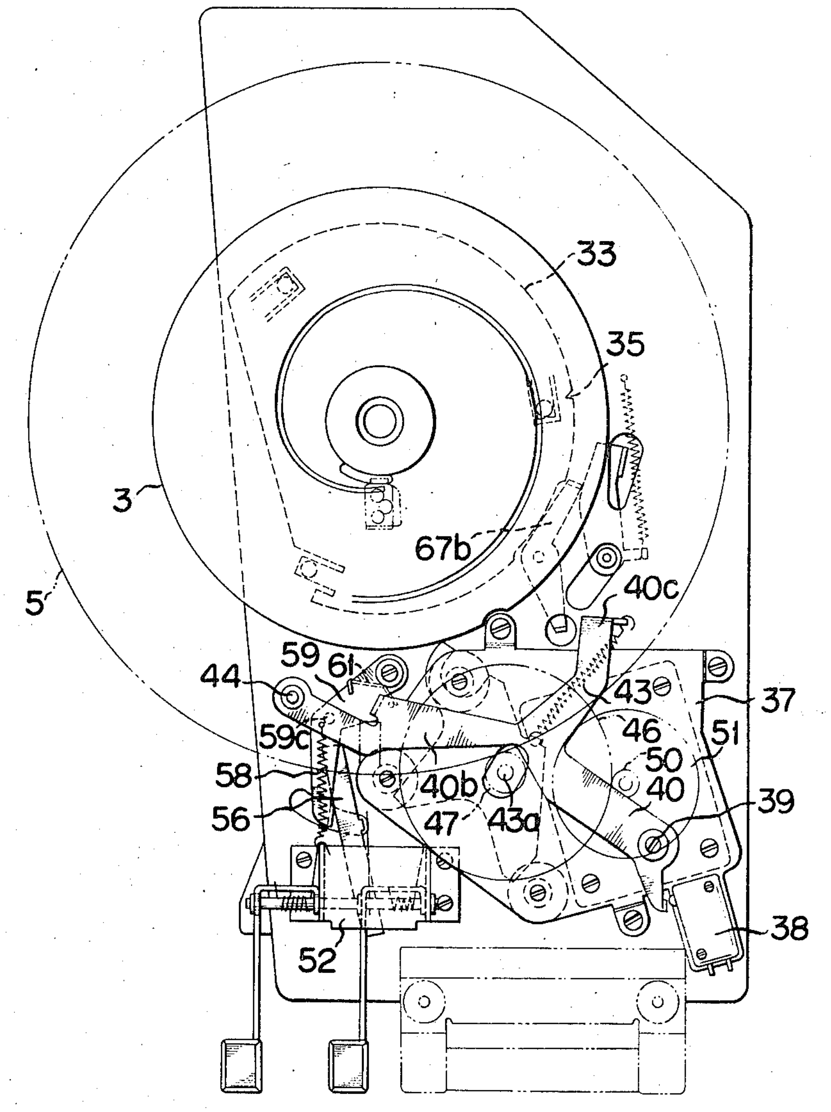
FIG. 12 is a similar view to FIG. 4 with an exception that the operation button II is depressed, the figure illustrating the device in the recording or reproduction operation.

Referring to FIGS. 5 and 9, an arm 60 whose ring-shaped base portion is fitted over the tubular shaft 10*a* is interposed between the stationary intermediate plate 10 and the segment 33 for horizontal rocking motion between the range defined by two stops 61. The arm 60 has two integral sidearms 60*a* and 60*b* extending in opposite directions and at the free end of the sidearm 60*a* the base portion of a connecting arm 62 is pivoted to a pin 63. A projection 62*a* is extending from one side edge of the free end portion of the connecting arm 62 through a hole 64 formed in the intermediate plate 10. This upright projection 62*a* is adapted to engage with a downwardly directed projection 5*a* formed eccentrically of the center of the lower turntable 5 at a suitable time as will be described in more detail hereinafter (See FIG. 3). A compression spring 65 is loaded between the intermediate plate 10 and an outwardly directed projection at the base portion of the connecting arm 62 so that the connection arm 62 has a tendency of rotating in the clockwise direction about the pivot 63 in FIG. 9. A lever 67 is pivoted to a pivot 66 and the sidearm 67*a* is extending from the intermediate plate between the inner side edge of the connecting arm 62 and the arcuate peripheral edge of the segment 33. The bent portion formed at the free end of the arm 67*a* has a tendency of pressing against the arcuate peripheral edge of the segment 33 due to the rocking tendency of the connection arm 62 as described above. The upwardly bent portion formed at the free end of the other sidearm 67*b* of the lever 67 is extending through a hole formed in the intermediate plate 10 and along one side edge of the bifurcated arm 40*c* of the rocking lever 40 as shown in FIGS. 4 and 12. A depending member 59*a* (see FIG. 9) formed by bending downwardly one side edge of the free end portion of the arm 59 (See FIG. 4) is extending through the arcuate slot formed in the intermediate plate 10 so as to oppose the leading edge of the sidearm 60*b* of the lever 60.

As shown in FIGS. 5 and 10, an upright lever 33*b* integral with the segment 33 is formed at an eccentric position thereof and is extending through the arcuate slot 31 formed in the synthetic disk 27 and the similar arcuate slot formed in the intermediate plate immediately below the slot 31.

C. Mechanism for repeating the playback of only an arbitrarily desired recorded portion As best shown in FIG. 8 and in other figures, a depending member carrying another pushbutton I is received by the bearing member 52 in a side-by-side relation with said pushbutton II. The pushbutton I has a similar construction and mechanism with those of the pushbutton II and has a tendency of moving upwardly up to a predetermined level. A lever 68 to which is articulated the lower end of the depending member carrying the pushbutton I is disposed on the undersurface of the stationary intermediate plate 10 as shown in FIG. 9. A pin 70 having a head and extending from the undersurface of the intermediate plate 10 is loosely fitted into a slot 69 having a predetermined length and being formed in the lever 68 so that the distance of the displacement of the lever 68 in the direction indicated by the arrow in FIG. 9 is limited.

The leading edge of the lever 68 is interposed between the intermediate plate 10 and the segment 33 and a pin 33*c* extending from an eccentric position upon the upper surface of the segment 33 is interposed loosely between the bifurcated portion of the lever 68. The functions of the construction described above will be further described in more detail hereinafter.

D. Mechanism for measuring or indicating recording time or length

Figure 15:
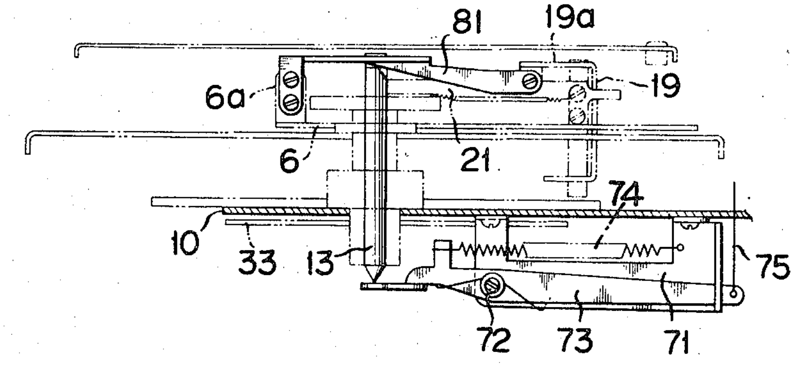
FIG. 15 is a longitudinal sectional view of an indicator mechanism.

As shown in FIGS. 9 and 15, a bridge member 71 is attached integral with the undersurface of the stationary intermediate plate 10. One leg of the bridge member 71 extends through a slot formed in the segment 33 so that the rotation of the segment 33 will not be prevented by this leg. A lever 73 is pivotably mounted upon a pivot 72 extending from the bridge member 71 and is biased to rotate in the clockwise direction by a spring 74 in FIG. 15. One arm end of the lever 73 is bent horizontally or at a right angle relative to the lever 73 so as to support the lower end of the central shaft 13 of the turntable. One end of a length of string 75 is fixed to the other arm of the lever 73 and this string extends through a hole formed in the intermediate plate 10 and laps over a guide wheel 76 mounted upon the intermediate plate 10 and two guide wheels 77 upon a graduate scale plate. The other end of the string 75 is fixed to one end of a compression spring 78 whose the other end is fixed to a suitable position of the intermediate plate 10. A pointer 79 is carried by the string 75 between said two guide wheels upon the graduated scale plate so that the pointer 79 may be displaced along the graduated scales 80, thereby indicating the recording time or length.

The slit 14 is formed at the top of the central shaft 13 which is supported by the lever 73 (See FIG. 2) and the one end portion of the rack 21 is slidably interposed in the slit 14. A cam lever 81 is disposed so as to extend across and immediately above one sidewall of the top portion of the shaft 13 which defines said slit 14. One end of this cam lever 81 is fixedly secured to the upwardly directed bent portion 19*a* of the plate 19 carried upon the sliding plate 6 as shown in FIG. 15. The other end of the cam lever 81 is securely fixed to the vertical leg portion 6*a* of an L-shaped securing member riveted to the sliding plate 6. The underside edge of the cam lever 81 is inclined and is pressed against the top of said one sidewall of the shaft 13 which is biased in the upward direction by the spring 74 shown in FIG. 15. Consequently, when the sliding plate 6 is displaced to the left in FIG. 15, the cam lever 81 integral therewith is caused to move toward the left so that the central shaft 13 is lowered because the top of this shaft is pressed down by the inclining side edge of the cam lever 81, thereby rotating in the counterclockwise direction the lever 73 about the pivot 72.

E. Operation of whole mechanism

Firstly, the alignment holes of the sheet 8 bearing spiral recording tracks are fitted over the projections of the casing 1 shown in FIG. 1 and thereafter the translucent cover 9 is closed. In this state, the upright pin 44 extending from the free end of the arm 40 (See FIG. 4) serves as a stopper for an angle-shaped member 5*b* secured to the undersurface of the lower turntable 5 so that the head 7 is located at the outermost position and is pressed against with the initial or starting point of the spiral recording track of the sheet 8. When the pushbutton II shown in FIG. 4 is depressed in this state, the lever 56 is caused to move forwardly so that the leading edge thereof pushes the inclining side edge of the arm 59 through the depending member 45 (See FIG. 7) bent downwardly from the sidearm 40*b* of the lever 40 so that the arm 59 is caused to rotate in the clockwise direction about the pivot 60 against the spring, whereby the depending member 45 engages with the stepped portion of the projection or detent 59*b* of the arm 59 (See FIG. 12), thereby holding the arm 59 in said displaced position. In this case, the arm 40 is also caused to rotate about the pivot 39 in the clockwise direction through relatively a small angle so that the pin 44 is retracted from the above-described position at which the pin 44 engages with the angle-shaped member 5*b* of the turntable 5 thereby preventing the rotation of thereof. Simultaneously the shaft 43*a* extending from the movable plate 43 connected to the arm 40*c* by the spring 43*b* is caused to rotate in the clockwise direction about the pivot 39. When the friction peripheral surface of the intermediate power transmission wheel 46 carried by the shaft 43*a* provides contact with the power wheel 50 carried by the output shaft 49 of the motor 48, the friction drive wheel 47 carried by the shaft 43*a* provides contact with the peripheral surface of the turntable 5. Concurrently, the upright projection or detent 40*a* of the arm 40 is moved away from the movable lever 38*a* of the microswitch 38 so that the current is supplied to the motor, which rotates the turntable 5.

Since the rack 21 is in engagement with the spiral grooves 15 formed upon the surface of the upright peripheral edge of the flange 11, the rack 21 and the sliding plate 6 integral with the rack 21 are caused to rotate about the central shaft 13 of the turntable 5 and simultaneously to move radially inwardly. Therefore, the head 7 resiliently supported upon the sliding plate 6 is also radially inwardly displaced along the spiral recording track of the sheet 8, thereby reproducing the sound (See FIGS. 3 and 5).

Upon completion of all reproduction, the upright pin 33*b* extending from the segment 33 is located in the passage of the projection 19*ba* formed at the inner end of the downwardly bent potion 19*b* of the plate 19 which moves together with the sliding plate 6 so that the upright pin 33*b* and the segment 33 integral therewith are caused to rotate through a predetermined angle against the spring 34. Therefore, the synthetic disk 27 is vertically moved away from the stationary intermediate plate 10 by a predetermined height or distance by pins 27*a* integral with the synthetic disk 27 which ride upon the inclined projections 33*a* of the segment 33 (see FIGS. 10 and 11). Since the segment 33 is caused to rotate through a predetermined angle as described above, the notch 35 formed in the periphery of the segment 33 shown in FIg. 12 is displaced to the position shown in FIG. 13 where the bent end of the arm 67*a* of the lever 67 pressed against the inner side edge of the connection arm 62 having a tendency to rotate in the counterclockwise direction by the spring 65 engages with the notch 35. Then, the segment 33 is held in position shown in FIG. 13 against the spring 34. Upon the vertical movement of the synthetic disk 27, the shaft 20 (See FIG. 5) and the rack 21 integral therewith are also caused to move upwardly so that the rack 21 is disengaged with the spiral groove of the flange 11, whereby the end portion of the rack 21 pushes upwardly one arm of the lever 25 shown in FIG. 2. Therefore, the projection 25*a* extending from the other arm of the lever 25 causes the small supporting plate 23 resiliently carried upon the sliding plate 6 and the head 7 carried by said plate 23 to move downwardly so as not to contact with the recording sheet.

Figure 13:
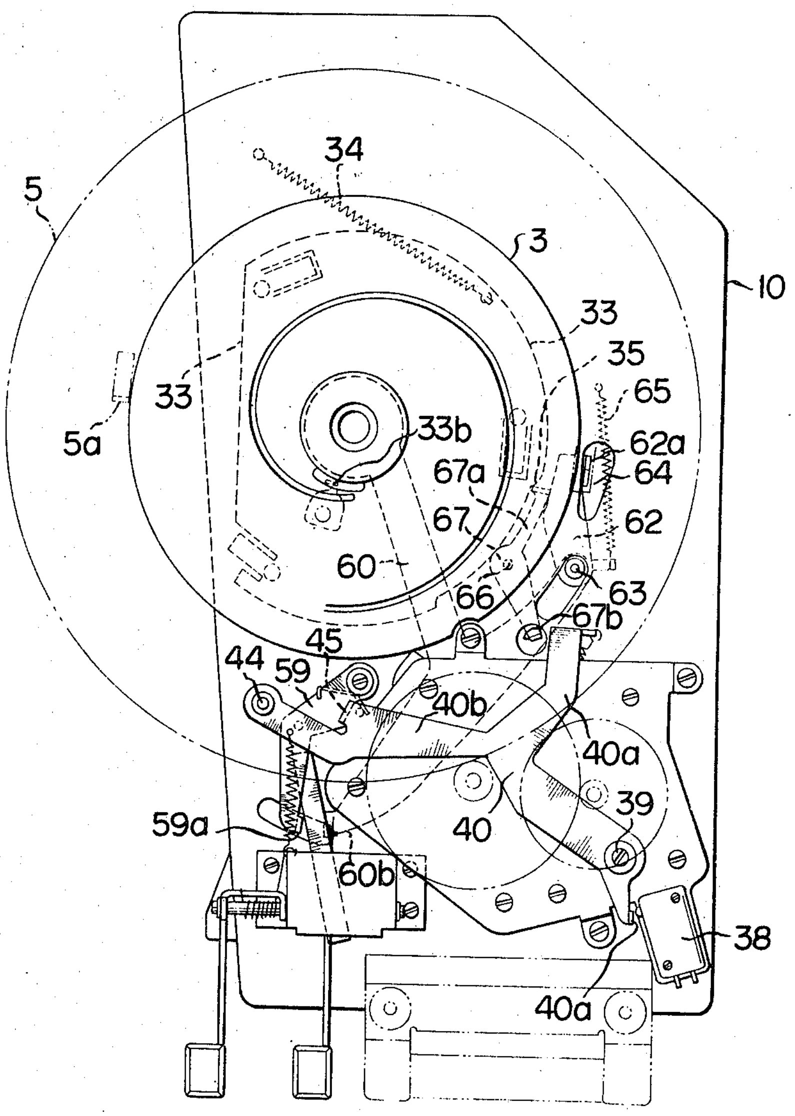
FIG. 13 is also a similar view to FIG. 4 illustrating the state when the head and the turntable is automatically returned to their initial positions shown in FIG. 4 upon completion of the recording or reproduction operation.
Figure 14:
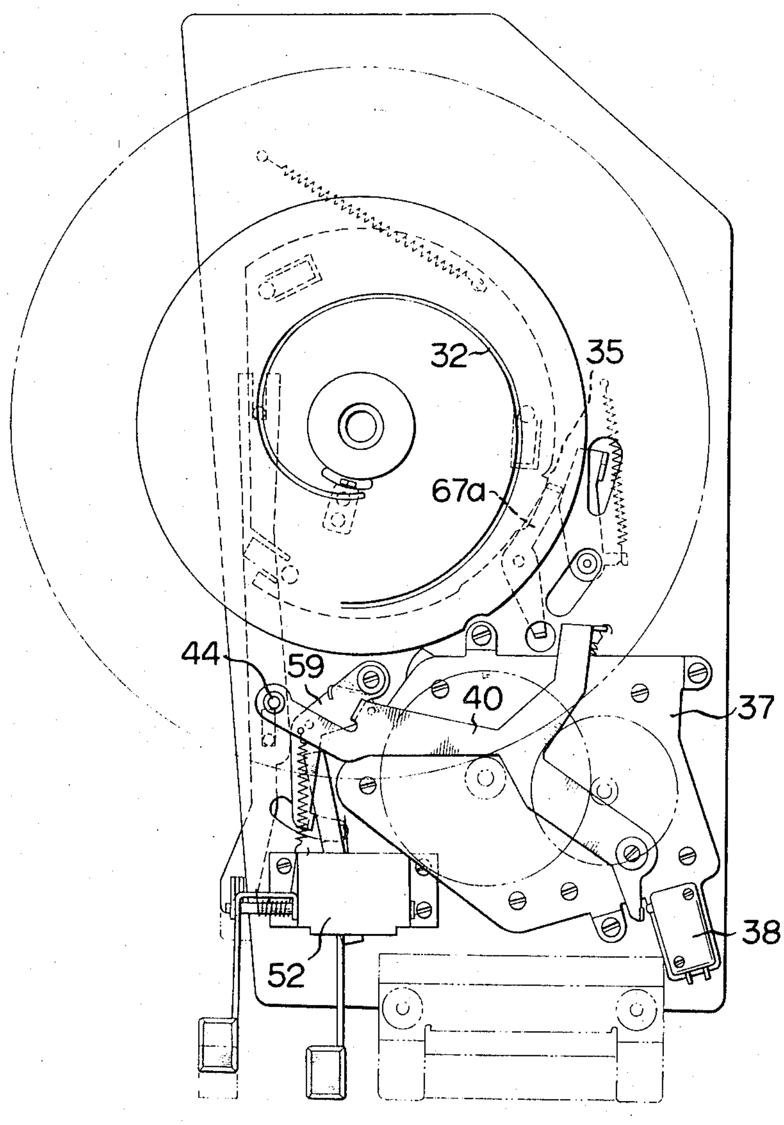
FIG. 14 is a plan view illustrating the displacement of the elements when the button I is depressed from the state shown in FIG. 13.

Simultaneously, the small rod 26 shown in FIG. 5 has its lower end engaged with the spiral groove 32 having a coarse or wide pitch and being formed upon the surface of the synthetic disk 27 in the vicinity of the inner end of said groove so that while the turntable 5 makes substantially one rotation in a short time the sliding plate 6 is radially outwardly moved, thereby radially outwardly moving the head 7. Then the downwardly directed protrusion 5*a* (See FIG. 3) of the turntable 5 engages with the upright member 62*a* of the connection arm 62 which is held in position as shown in FIG. 13 so that the arm 60 is caused to rotate in the counterclockwise direction in FIG. 13 through the arm 62. Therefore, the side lever 60*b* integral with the arm 60 has its leading end abutted against the depending member 59*a* depending from the side edge of the leading end portion of the arm 59 so that the arm 59 is caused to swing against its tendency. Consequently the depending member 45 depending from the branched arm 40*b* of the arm 40 is released from the stepped portion of the projection or detent 59*b* formed at the inner side edge of the arm 59 so that the arm 40 is caused to rotate about the pivot 39 by its tendency, thereby returning the upright pin 44 at the free end of the arm 40 to the position shown in FIG. 4. Then the angle-shaped member 5*b* attached at the undersurface of the turntable 5 engages with the upright pin 44 (See FIG. 3). Concurrently, the upright projection or detent 40*a* at the end of the arm 40 pushes the movable lever of the microswitch 38, thereby interrupting the supply of the current to the motor. At the same time, the side edge of the branched arm 40*a* of the arm 40 engages with the upright member 67*b* at the end of the arm of the lever 67 so that the lever 67 is rotated about the pivot 66 in the clockwise direction in FIG. 13, thereby the bent portion at the leading end of the arm 67*a* is released from the notch formed in the peripheral edge of the segment 33. Concurrently, the segment 33 is caused to rotate through a predetermined angle by its tendency so that all of the moving elements are returned to their initial positions as shown in FIG. 4.

In this case, it should be noted that upon rotation of the lever 67 the connection arm 62 is caused to rotate about the pivot 63 against the spring 65 so that the upright member 62*a* of the connection arm 62 is displaced from the position shown in FIG. 13 to the position shown in FIG. 4, thereby retracting from the passage of the downwardly directed protrusion 5*a* of the turntable 5.

Next the operation for stopping the playback during the course of the playback of the recording sheet will be described hereinafter. As described above, the state in which the playback is being effected is illustrated in FIG. 12. In this case, the arm 59 is held in position shown in FIG. 12 and the lever 56 is inclined toward the left as the depending member of the arm 59 is displaced so that the leading end is directed toward the pin 59*c* extending from the undersurface of the arm 59. When the pushbutton II is depressed again in this state, the lever 56 pushes the pin 59*c* so that the arm 59 is rotated about the pivot against the spring 61 through a small angle of rotation in the clockwise direction. Then the depending member 45 (See FIG. 7) of the branched arm 40*b* of the arm 40 is released from the projection 59*b* of the arm 59 so that both of the arms 59 and 40 rotate about their pivots in the counterclockwise direction, thereby returning to the state as shown in FIG. 4. In this state the microswitch 38 is turned off and the power transmission to the turntable 5 from the output shaft of the motor through the friction wheel is interrupted so that the turntable 5 is stopped, thereby stopping the playback of the sheet. Thereafter, when the pushbutton II is depressed again (because there is no reason for stopping the playback), the playback is started again in the similar manner as described hereinabove.

Next the mode of operation of the mechanism for indicating the recording or playback time or length during the playback will be described. In FIG. 15, during the reproduction the rack 21 carrying the head 7 and the cam lever 81 are displaced toward the left in FIG. 15 so that the central shaft 13 is pushed downwardly by the inclining side edge of the cam 81, thereby causing the lever 73 to rotate about its pivot 72 in the counterclockwise direction against its tendency. The slack of the string 75 one end of which is connected to the lever 73 is absorbed by the compression spring shown in FIG. 4 and in this case the pointer 79 carried by the string being displaced indicates the length of the spiral track reproduced or recorded upon the graduated scales 80.

Next the operation of the mechanism for repeating the playback of only an arbitrarily selected portion of the recording sheet will be described. Referring back to FIG. 12 which illustrates the state of the playback, the pushbutton I is depressed at a suitable time and is kept depressed for some time. Then, the lever 68 drivingly connected to the pushbutton I is displaced in the direction indicated by the arrow in FIG. 9 so that the segment 33 is rotated by the pin 33*c* against the spring 34. However, the angle of rotation of the segment 33 is limited by the length of the slot 69 formed in the lever 68 so that the segment 33 is stopped before the notch 35 formed in the peripheral edge of the segment 33 engages with the depending member of the arm 67*a* of the lever 67. As described in the operation of the automatic return mechanism, when the segment 33 is rotated against its tendency, the synthetic disk 27 is caused to upwardly move away from the segment 33 so that the rack 21 is moved upwardly while the head 7 is moved downwardly. Since the synthetic disk 27 remains rotated, the lower end of the small rod 26 shown in FIG. 5 engages with the spiral groove 32 upon the synthetic disk 27 at a certain position of the spiral groove after the pushbutton I has been depressed but before the synthetic disk 27 makes one complete rotation. Therefore, the sliding plate 6 carrying small rod 26 and the head 7 is moved radially outwardly of the turntable 5 at high speed. In this case, the operator watches the indication of the pointer 79 and when the pointer 79 returns to a desired graduated scale, the operator releases the pushbutton I. Then, the segment 33 returns to its initial position by its tendency and simultaneously said synthetic disk and the rack are moved downwardly while the head is moved upwardly, thereby repeating the playback.

I claim:

1. A spiral track magnetic recording and reproducing device having a recording and reproducing head mounted on a rack for radial movement in selective contact with a track on a recording sheet comprising

- a drive engageable with said rack for providing the movement thereof;
- a first pushbutton;
- a first lever means contacted by said first pushbutton for actuating movement thereof;
- a second lever means adapted to be contacted by said first lever means, said second lever means having a plurality of arms with a first pin mounted on the end of one arm;
- a turntable on which said head is mounted, said turntable having a projection against which said first pin abuts;
- a rotatable segment coaxial with said turntable, rotation of said segment operable to move said head out of contact with said sheet, and to move said rack out of engagement with said drive;
- a disk coaxial with said segment and having a spiral groove therein, an element connected with said head in fixed relation thereto, said spiral groove engageable by said element to move said head radially outwardly when said head is out of contact with said sheet;
- said turntable being rotatable with respect to said disk and said rotatable segment, and said rotatable segment being rotatable with respect to said disk;
- spring means mounted on said device and connected to said rotatable segment to provide a tendency for said rotatable segment to rotate in a predetermined direction;
- a power source for driving said turntable to allow said head to effect said radial movement;
- switch means for said power source, said switch means energized by actuation of said first pushbutton causing rotating movement of said second lever means which simultaneously moves said first pin out of abutment;
- a second pushbutton;
- a third lever means contacted by said second pushbutton for actuating movement thereof, said third lever means having a first slot therein;
- a second pin mounted on said device and extending into said first slot to allow a predetermined movement of said third lever means; and
- said third lever means adapted to contact and rotate said rotatable segment when said second pushbutton is actuated for a selective incremental rotation corresponding to said predetermined movement thereby allowing said head to move out of contact with said sheet and radially outwardly for a desired distance corresponding to the time said second pushbutton is actuated.

2. A spiral track magnetic recording and reproducing device according to claim 1, in which said rotatable segment includes a notch on its outer periphery engageable by a second element to hold said segment in a nonrotating position, and said notch of said segment is maintained in disengaged position by the contact movement of said third lever means.

3. A spiral track magnetic recording and reproducing device according to claim 1, in which said rotatable segment has a third pin projecting therefrom, and said third lever means includes a bifurcated end portion contacting said third pin to provide the rotation of said rotatable segment.

* * * * *